(12) United States Patent
Norton et al.

(10) Patent No.: US 11,989,562 B2
(45) Date of Patent: May 21, 2024

(54) DEVICE STATE DATA LOADING ONTO RFID CHIP

(71) Applicant: Lenovo (Singapore) Pte. Ltd., Singapore (SG)

(72) Inventors: Robert Norton, Raleigh, NC (US); Robert J. Kapinos, Durham, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 16/993,696

(22) Filed: Aug. 14, 2020

(65) Prior Publication Data

US 2022/0050688 A1 Feb. 17, 2022

(51) Int. Cl.
| | | |
|---|---|---|
| G06F 15/177 | (2006.01) | |
| G06F 9/00 | (2006.01) | |
| G06F 9/4401 | (2018.01) | |
| G06F 11/14 | (2006.01) | |
| G06F 21/57 | (2013.01) | |
| G06K 19/07 | (2006.01) | |

(52) U.S. Cl.
CPC ........ *G06F 9/4403* (2013.01); *G06F 11/1448* (2013.01); *G06F 11/1469* (2013.01); *G06F 21/572* (2013.01); *G06K 19/0723* (2013.01)

(58) Field of Classification Search
CPC ............... G06F 9/4403; G06F 11/1448; G06F 11/1469; G06F 21/572; G06K 19/0723; G06K 19/07707
See application file for complete search history.

(56) References Cited

U.S. PATENT DOCUMENTS

| | | | | |
|---|---|---|---|---|
| 5,657,448 | A | * | 8/1997 | Wadsworth ............. H04L 67/00 713/100 |
| 7,040,532 | B1 | * | 5/2006 | Taylor .................... G06Q 10/08 235/472.01 |
| 9,697,387 | B1 | * | 7/2017 | Bowman ............ G06K 7/10009 |
| 2007/0106765 | A1 | * | 5/2007 | Erickson ................. G07F 9/002 340/572.1 |
| 2010/0060928 | A1 | * | 3/2010 | Lee ..................... H04N 1/00925 358/1.15 |
| 2012/0036507 | A1 | * | 2/2012 | Jonnala ................... H04L 67/10 717/174 |
| 2017/0063490 | A1 | * | 3/2017 | Liu ..................... G06K 19/0723 |
| 2018/0082083 | A1 | * | 3/2018 | Smith ................... G06F 21/575 |
| 2018/0129924 | A1 | * | 5/2018 | Cutrignelli ......... G06K 19/0712 |

(Continued)

OTHER PUBLICATIONS

"Electronic Paper", Wikipedia, retrieved on Jul. 29, 2020 from https://en.wikipedia.org/wiki/Electronic_paper.

(Continued)

*Primary Examiner* — Xuxing Chen
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to determine a device state such as a device error. The instructions may also be executable to, responsive to the determination, load data related to the device state onto a radio-frequency identification (RFID) chip or other RFID element.

20 Claims, 5 Drawing Sheets

(56) References Cited

U.S. PATENT DOCUMENTS

| | | | | |
|---|---|---|---|---|
| 2018/0225169 A1* | 8/2018 | Kotteri | ................. | G06F 11/302 |
| 2019/0205042 A1* | 7/2019 | Kandula | ................ | G06F 3/0619 |
| 2019/0220720 A1* | 7/2019 | Durak | .............. | G06K 19/07758 |
| 2019/0251411 A1* | 8/2019 | Gire | ................ | G06K 19/07707 |
| 2019/0272206 A1* | 9/2019 | Tsai | ................... | G06F 11/0766 |
| 2020/0320053 A1* | 10/2020 | He | ...................... | G06F 16/2282 |
| 2020/0342105 A1* | 10/2020 | Abergel | ............... | G06F 21/567 |
| 2021/0065439 A1* | 3/2021 | Stafford | ................. | G06T 15/50 |
| 2022/0113979 A1* | 4/2022 | Chang | ................ | G06F 11/2284 |

OTHER PUBLICATIONS

"Radio-Frequency Identification", Wikipedia, retrieved on Jul. 28, 2020 from https://en.wikipedia.org/wiki/Radio-frequency_identification.

* cited by examiner

DEVICE STATE DATA LOADING ONTO RFID CHIP

FIELD

The present application relates to technically inventive, non-routine solutions that are necessarily rooted in computer technology and that produce concrete technical improvements.

BACKGROUND

As recognized herein, when a computer fails, a technician often has to diagnose the problem from scratch. This may include turning the device on again even if the problem involves malware, ransomware, or other data security issues, which can further compromise the device itself as well as any sensitive information stored on the device. Even then, the technician typically has to tediously parse through various locations to identify the source of the problem and/or run specialized diagnostics. Not only is that time consuming, but it might not result in an accurate diagnosis of what the actual problem was in the first place. Furthermore, there might be instances where the device cannot be turned on at all without resolving the problem if the problem was serious enough, and without a way to power up the device to determine the problem the entire device becomes useless. There are currently no adequate solutions to the foregoing technological problem related specifically to computer errors.

SUMMARY

Accordingly, in one aspect a device includes at least one processor and storage accessible to the at least one processor. The storage includes instructions executable by the at least one processor to determine that a device error has occurred and to, responsive to the determination, load an error code onto a radio-frequency identification (RFID) chip. The error code corresponds to the error.

In some examples, the device may include the RFID chip itself and the device error may be a last-known error prior to the device being powered off.

Also in some examples, the error code may be loaded onto the RFID chip using a power source used to power the device for purposes other than loading data onto the RFID chip.

In various example implementations, the error code may be loaded onto the RFID chip using antivirus software, the device's basic input/output system (BIOS), a diagnostic utility, and/or firmware.

Still further, in some examples the device may include an electronic ink (e-ink) display and the error code may also be presented on the e-ink display prior to the device being powered off so that the error code remains presented on the e-ink display after the device is powered off.

In another aspect, a method includes determining a device state pertaining to a device and, responsive to determining the device state, storing data related to the device state in a radio-frequency identification (RFID) tag.

In some example implementations, the device state may be a last-known device state that existed prior to a most-recent shutdown of the device, and the device state may be determined and the data may be stored responsive to a shutdown signal.

In various example implementations, the data may indicate a lack of device errors at device shutdown or may indicate one or more device errors at device shutdown. The device errors may be last-known errors that existed at a most-recent device shutdown.

In some examples, the device may be a first device and the method may also include transmitting the data from the RFID tag to a second device while the device is shutdown. The second device may be different from the first device.

Also in various examples, the device state may be identified using one or more of antivirus software, the device's basic input/output system (BIOS), a diagnostic utility, and/or device firmware.

In still another aspect, at least one computer readable storage medium (CRSM) that is not a transitory signal includes instructions executable by at least one processor to determine a device state for a device. The instructions are also executable to, responsive to the determination of the device state, write data related to the device state onto a radio-frequency identification (RFID) element.

So, for example, the device state may include a device error and the instructions may be executable to write data related to the device error onto the RFID element. The data may include an error code corresponding to the device error.

Also, in some example implementations the instructions may be executable to write the data to the RFID element responsive to a device shutdown signal.

The details of present principles, both as to their structure and operation, can best be understood in reference to the accompanying drawings, in which like reference numerals refer to like parts, and in which:

DETAILED DESCRIPTION

The present application discloses, among other things, using a hybrid active/passive RFID chip to write one or more last-known error codes of a device at a most-recent shutdown of the device. The error codes may then be read with a passive reader at a later time to fix the device (e.g., even if the error would otherwise result in the device not being able to be powered up again).

Thus, the RFID chip may be configured to save the error data as output from a diagnostic or BIOS utility, for example. Then, at a later time, just reading the RFID chip in passive mode may provide what the last error was on the system. This allows for fast, accurate disposition of the broken system at a later time so that the error(s) may be addressed.

In some implementations, the RFID chip may be incorporated into a credit card-sized asset tag affixed or chained to the computer system. Thus, at any given time a scan of the RFID tag even with the system itself powered off may provide data including the last identified failure on the system.

As an example, in a school setting computers are commonly interchangeable between students. If one computer breaks, a student might be supplied with another computer right then and there, and the broken machine might be bonepiled in a storage closet until the school's information technology (IT) team can address the broken computer. When a member of the IT team then goes to fix the broken computer, a scan of the computer's RFID tag can indicate what needs to be fixed for the computer to turn back on again (e.g., if the error is fatal or near-fatal) or to otherwise operate properly.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
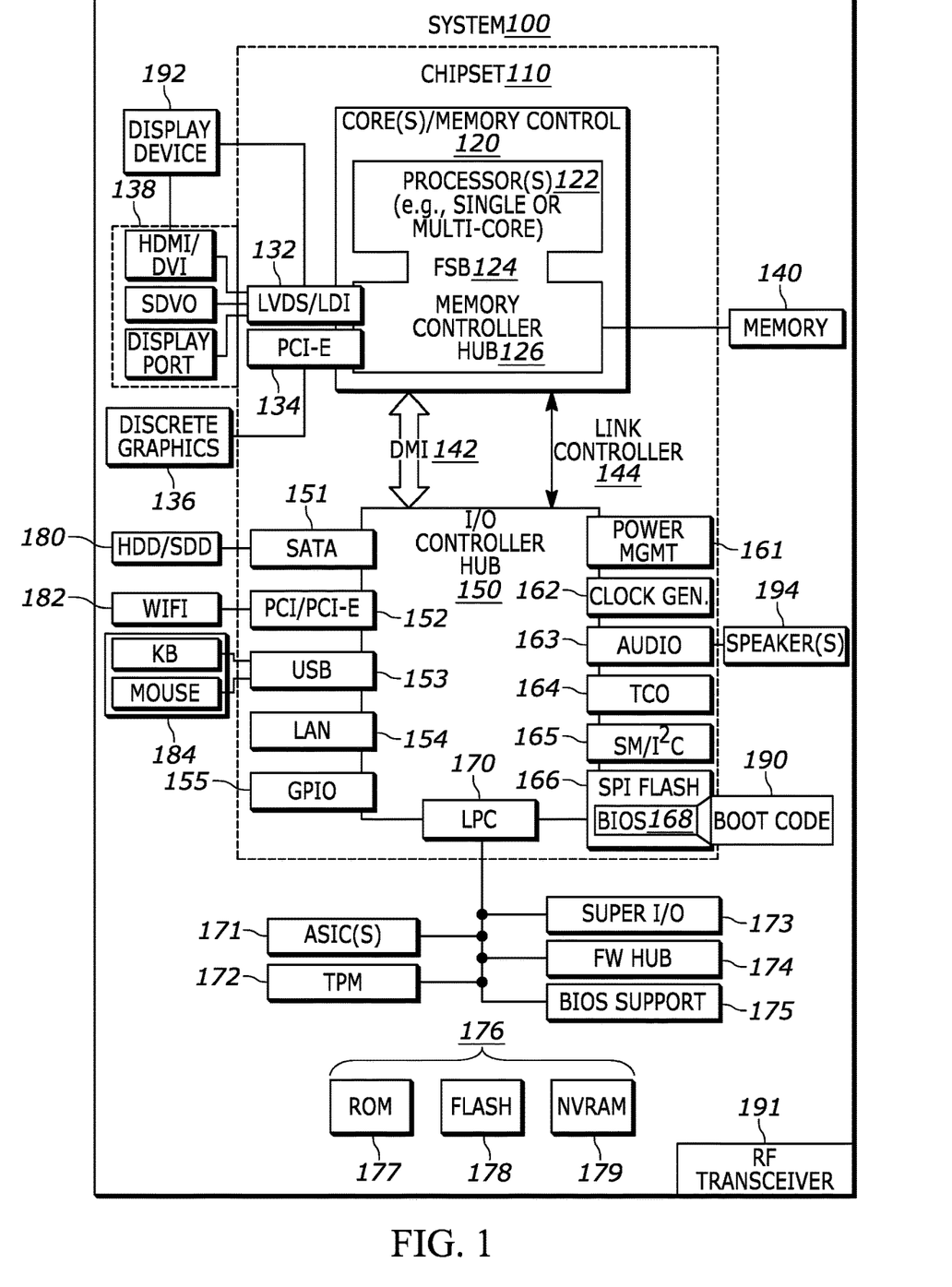
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190.

BIOS may be a set of routines stored in read-only memory that enable the system 100 to start an operating system and to communicate with the various devices such as disk drives, keyboard, monitor, printer, and communications ports. In some example embodiments, functions performed by BIOS may also be performed by other higher level software application programs. In other example embodiments, BIOS may be a Unified Extensible Firmware Interface (UEFI) which assists in control handoff of a computer system to an operating system during a pre-boot environment (e.g., after the computer system is powered on, but before the operating system starts).

With respect to network connections, the I/O hub controller 150 may include integrated gigabit Ethernet controller lines multiplexed with a PCI-E interface port. Other network features may operate independent of a PCI-E interface. The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

FIG. 1 also shows that the system 100 may include a radio frequency (RF) transceiver/antenna 191 for communicating with an RF identification (ID) chip or tag under control of the processor(s) 122 consistent with present principles. RF communication may thus occur between the system 100 and the RFID tag in the frequency range of 30 kHz to 300 GHz, for example.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
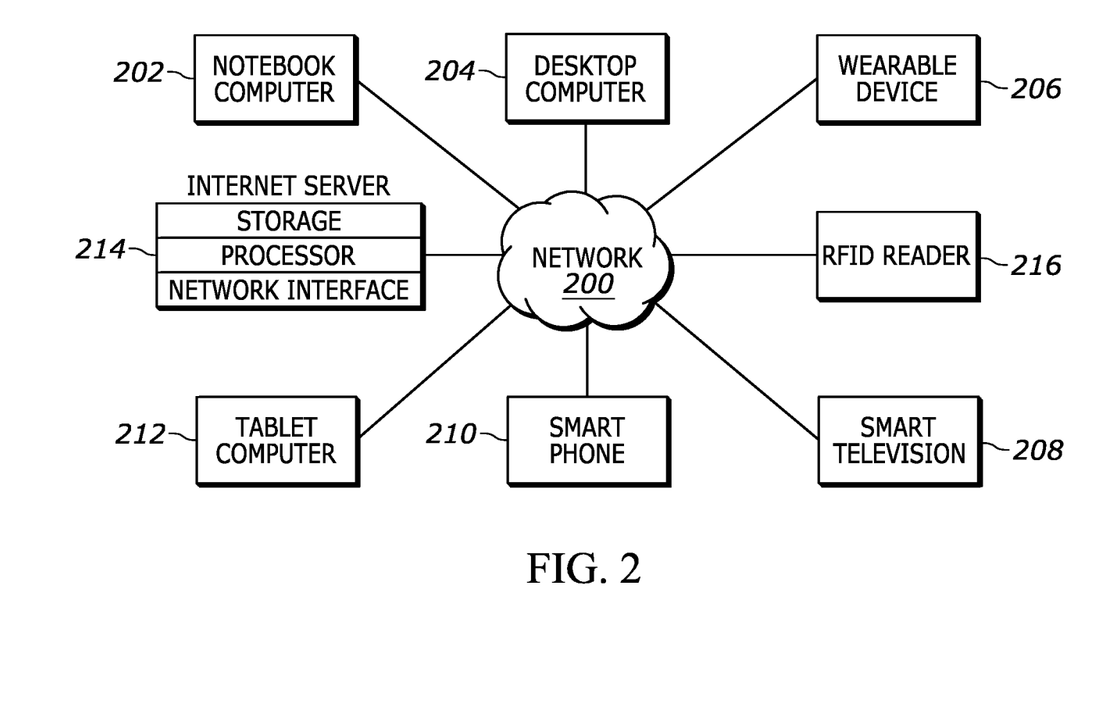
FIG. 2 is a block diagram of an example network of devices consistent with present principles.

Turning now to FIG. 2, example devices are shown communicating over a network 200 such as the Internet. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, an RFID tag reader 216, and a server 214 such as an Internet server that may provide cloud storage accessible to the devices 202-212, 216. It is to be understood that the devices 202-216 may be configured to communicate with each other over the network 200 to undertake present principles. For example, the RFID reader 216 may be an active reader to read a passive RFID tag or other RFID element and then report data read from the tag to another one of the devices shown in FIG. 2 for presentation of the data (e.g., error code) on the display of the other device.

Figure 3:
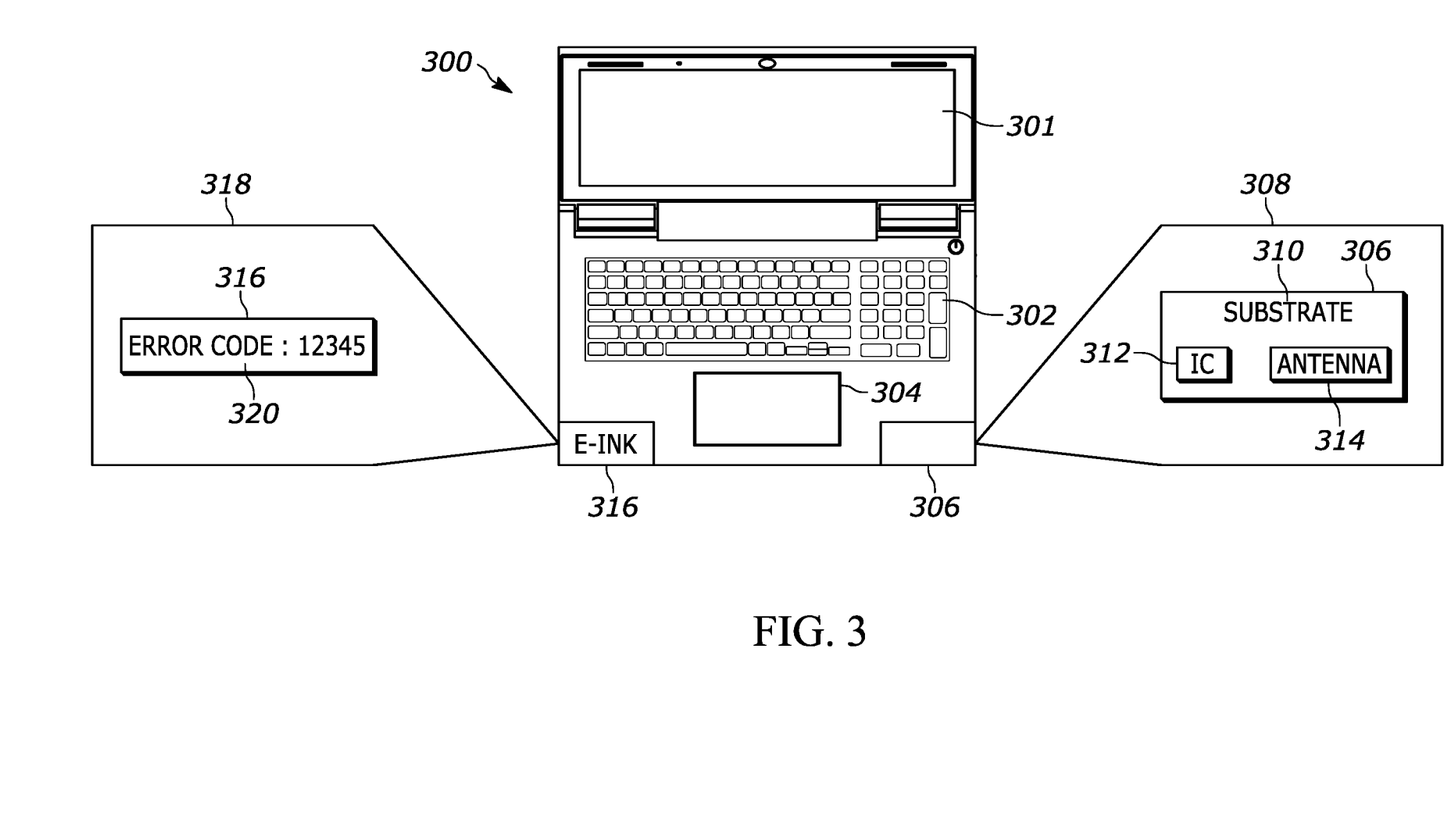
FIG. 3 is a block diagram of an example device that may operate consistent with present principles along with exploded views of an example RFID tag and e-ink display consistent with present principles.

Now in reference to FIG. 3, a perspective view of an example laptop computer 300 is shown. However, note that present principles may also be applied to other types of computers as well, including desktop computers, smart phones, tablet computers, wearable devices, etc. In any case, also note that the computer 300 may include some or all of the elements described above in reference to the system 100 of FIG. 1. So, for example, the computer 300 may have, among other things, an LCD display 301, keyboard 302, and track pad 304.

As also shown in FIG. 3, the computer 300 may have an RFID chip or tag 306 (or other wireless chip) attached to the housing of the computer 300 or even coupled to the housing via an electrical cord. Exploded view 308 shows that the tag 306 may include a substrate 310 inside as well as an integrated circuit (IC) 312 on the substrate 310 that processes and stores data such as errors codes and device state data as described herein.

Also shown in the exploded view 308 is a transceiver/antenna 314. The transceiver 314 may be used for RF communication with another RF transceiver on the computer 300, where the other transceiver may be controlled by a central processing unit (CPU) and/or device software or firmware within the computer 300. Thus, upon detecting a device error or shutdown signal, the computer 300 may use its own RF transceiver to communicate with the antenna 314 to write a device error code or other device state data to the IC 312 using a power supply for the device that is used for purposes beyond loading/writing data onto the RFID tag 306 itself. The shutdown signal may be generated based on a command provided by an end-user of the computer 300 and/or may be an automatic shutdown signal initiated by the CPU or other processor in the computer 300 as might happen in the event of a computer failure or crash.

Still in reference to FIG. 3, in some examples the computer 300 may also include a second display 316 that may be an electronic ink (e-ink) display. The e-ink display 316 may use electrophoretic technology, electrowetting technology, etc. Thus, for example, the e-ink display 316 may be formed at least in part by a microencapsulated electrophoretic display. Further, the e-ink display may be a grayscale display, though color e-ink displays may also be used in certain examples.

As shown in exploded view 318, the e-ink display 316 may be controlled by the CPU or other processor in the computer 300 to present an error code 320 or other device state data consistent with present principles. Owing to the e-ink display 316 not needing electricity to continue presenting the code 320 after initially being presented under control of the CPU in the computer 300, the e-ink display 316 may continue to present the error code 320 even after the computer 300 is powered off.

Figure 4:
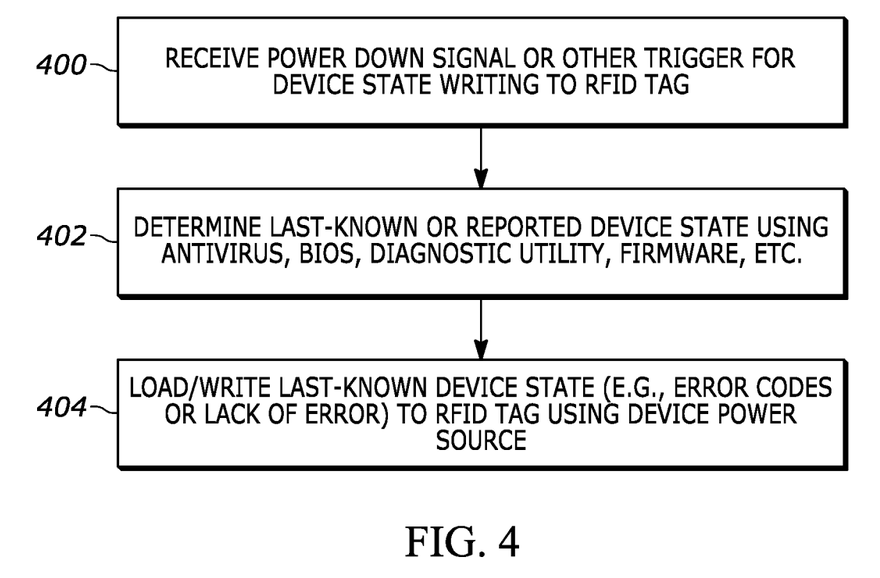
FIG. 4 shows a flow chart of an example algorithm that may be executed by a computer consistent with present principles.

Continuing now in reference to FIG. 4, it shows example logic that may be executed by a device such as the system 100 and/or computer 300 in accordance with present principles. Beginning at block 400, the device may receive a shutdown signal or other trigger for the device to write device state data to an RFID tag such as the tag 306. Again note that the shutdown signal may be received based on user command, CPU command, application command, etc. Other triggers besides a shutdown signal may include a device error initially occurring and a recurring period of time transpiring (e.g., if a current device state is to be overwritten onto the RFID tag every 10 minutes, for example).

From block 400 the logic may then proceed to block 402. At block 402 the device may determine a last-known or reported device state (e.g., prior to the device being powered off or otherwise shutting down). For example, antivirus software might be executing at the device to monitor device errors and to report different error codes for different device errors that might be detected as currently ongoing when a shutdown signal is received. Other software applications (apps) as well as the device's diagnostic utilities (e.g., Device Manager in Windows), the device's basic input/output system (BIOS) and/or other device firmware may also be used to detect and report device state, including any currently-existing device errors.

Thus, existing algorithms and utilities for detecting device state and errors may be used for detecting the state or errors specifically, and then the device may communicate with the RFID tag at block 404 via RF communication in order to write the errors (or lack thereof) to the RFID tag (e.g., in addition to or in lieu of writing device errors to the device's scratchpad memory). Also at block 404, in some examples the error code or other device state may be presented on an e-ink display as described above in reference to FIG. 3. For example, specific error codes may be presented for specific errors, and "no error" may be presented when no error was reported as existing at device shutdown.

Note that the RFID tag may be powered using the device's own external power source (e.g., an AC adapter) in order for the tag's integrated circuit to store the error code(s) and possibly overwrite already-stored error codes for errors that are outdated or no longer exist. Thus, the RFID tag may be a hybrid active/passive RFID tag in that it may receive device power from a device power supply or internal computer battery (still external to the RFID tag) to overwrite old codes on the RFID tag with new codes for currently-existing device conditions, yet may still be passive in that it need not have its own internal power source to have its data read by an active reader configured to read passive RFID tags. Notwithstanding, in other examples the RFID tag may have its own internal battery if an active RFID tag is desired.

In any case, device errors themselves for which codes are stored in the RFID tag may relate to any number of things. For instance, the errors may relate to a device driver not being configured or working properly, a driver needing to be reinstalled, device hardware (e.g., a track pad, universal serial bus port, or speaker) not being connected as expected, device hardware being detected but not identifiable, a digital signature for a driver not being verifiable, device hardware being disabled or not operational, processing or storage resources being unavailable or at maximum capacity, the device not being able to work properly until a device restart is executed, the device not being able to restart, a file or storage area being corrupted, software being blocked from starting because it is known to have issues with the device's guest operating system, the device experiencing power loss, and/or the device experiencing an unknown device failure or device crash. Each corresponding error code that gets reported for a given error may be preestablished by an administrator or the device's manufacturer. Or if no error exists, a code may be established for that as well for that code to be written to the RFID tag.

Figure 5:
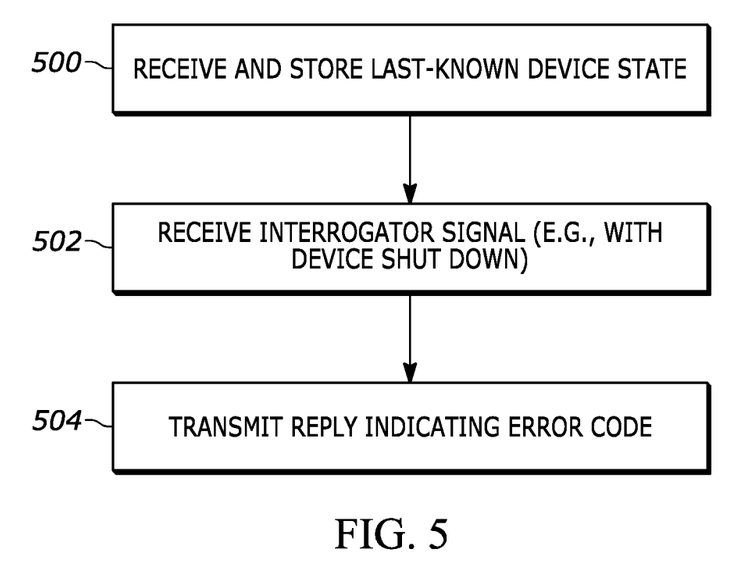
FIG. 5 shows a flow chart of an example algorithm that may be executed by an RFID tag consistent with present principles.

Now describing FIG. 5, it shows example logic that may be executed by an RFID tag consistent with present principles, such as the RFID tag to which one or more error codes are written at block 404. Beginning at block 500, the RFID tag may receive device state data from the other device via the RFID tag's antenna. Again, the device state data may include one or more error codes indicating one or more device errors. Also at block 500, the RFID tag may store the received data. From block 500 the logic may proceed to block 502.

At block 502 the RFID tag may, via its antenna, receive an interrogator signal from a device other than the computer to which the RFID tag is attached, such as the reader 216 discussed above. This may be done even with the computer itself powered down since the reader may be an active reader for reading passive RFID tags. From block 502 the logic may then move to block 504.

At block 504 the RFID tag may transmit a reply to the reader that transmitted the interrogator signal. The reply may include the error code(s) stored at the RFID tag or a code indicating no error. In some examples, the RFID tag may even reply that there is an absence of an error code or any code stored at the RFID tag (e.g., "no error"). The reader itself may then present the reply on its own display and/or transmit it to another computer for presentation.

Figure 6:
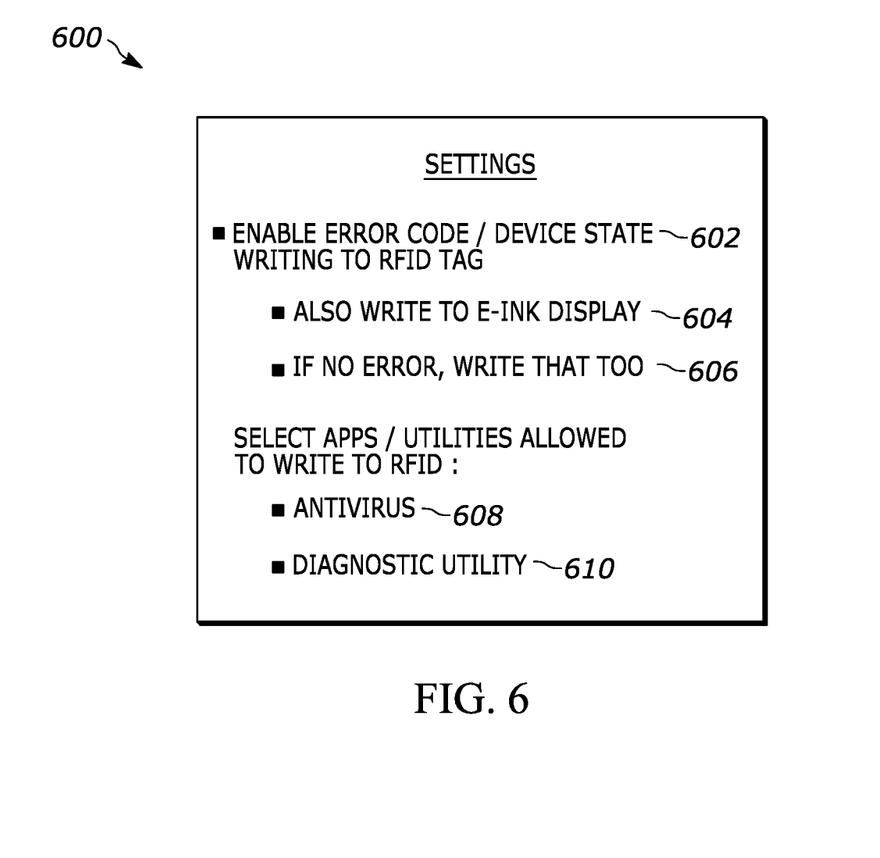
FIG. 6 shows an example graphical user interface (GUI) for configuring one or more settings of a computer consistent with present principles.

Now in reference to FIG. 6, it shows an example graphical user interface (GUI) 600 that may be presented on the display of a device consistent with present principles. For example, the GUI 600 may be presented on the primary LED display of a device that is configured to execute the logic of FIG. 4, such as the display 301 of FIG. 3. It is to be further understood that the GUI 600 itself may be presented for an end-user or system administrator to configure one or more settings of the device to operate consistent with present principles. Each of the settings options or sub-options discussed below may be selected by directing touch or cursor input to the respective check box adjacent to each option.

As shown in FIG. 6, the GUI 600 may include a first option 602 to set or enable the device to, in the future, write error codes and other device state data to an RFID tag consistent with present principles. For example, the option 602 may be selected to set or configure the device to undertake the functions described above in reference to the device 300 of FIG. 3 as well as the logic of FIG. 4.

In some examples, the GUI 600 may also include a sub-option 604. The sub-option 604 may be selectable to set or configure the device to also present error codes written onto an RFID tag onto an e-ink display as well. In some examples, a sub-option 606 may also be presented that may be selectable to set or configure the device to write a lack of errors to an RFID tag as described herein (in addition to writing actual errors).

Additionally, note that in some examples the GUI 600 may include various options 608, 610. The options 608, 610 may each be selectable to grant permissions to a certain app or utility that is executable at the device to write to the device's RFID tag consistent with present principles. So, for example, antivirus software may be granted permission (option 608) and a guest operating system diagnostic utility may also be granted permission (option 610).

It may now be appreciated that present principles provide for an improved computer-based user interface that improves the functionality, diagnostics, and ease of use of the devices disclosed herein. The disclosed concepts are thus rooted in computer technology.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   present a settings graphical user interface (GUI) on a display, the settings GUI being usable to configure one or more settings of the device to operate to determine device errors and to load associated error codes onto a radio-frequency identification (RFID) chip, the settings GUI comprising at least first and second settings options, the first settings option being selectable to grant permission to a first application to load error codes onto the RFID chip responsive to determinations that device errors have occurred, the second settings option being selectable to grant permission to a second application to load error codes onto the RFID chip responsive to determinations that device errors have occurred, the second application being different from the first application;
   determine that a first device error has occurred; and based on the determination, load an error code onto the RFID chip, the error code corresponding to the first device error.

2. The device of claim 1, wherein the settings GUI comprises a third settings option, the third settings option being selectable to set the device to, in the future, load error codes onto the RFID chip, the third settings option being different from the first and second settings options.

3. The device of claim 2, wherein the settings GUI comprises a fourth settings option, the fourth settings option being selectable to set the device to, in the future, present error codes on an electronic ink display, the fourth settings option being different from the first, second, and third settings options.

4. The device of claim 2, wherein the settings GUI comprises a fourth settings option, the fourth settings option being selectable to set the device to, in the future, write to the RFID chip that no device error has occurred, the fourth settings option being different from the first, second, and third settings options.

5. The device of claim 1, wherein the first application is an antivirus application.

6. The device of claim 5, wherein the second application is a diagnostic utility different from the antivirus application.

7. The device of claim 1, comprising the RFID chip.

8. The device of claim 7, wherein the RFID chip has its own internal battery for powering the RFID chip to store error codes.

9. The device of claim 1, wherein the instructions are executable to:
based on the determination, overwrite, on the RFID chip, already-stored error codes for errors that are outdated or no longer exist.

10. A method, comprising:
presenting a settings graphical user interface (GUI) on a display, the settings GUI being usable to configure one or more settings of a device to operate to determine device errors and to load associated error codes onto a radio-frequency identification (RFID) tag, the settings GUI comprising a first settings option, the first settings option being selectable to set the device to, in multiple future instances, load error codes onto the RFID tag;
determining that a first device error has occurred; and
based on the determining, storing data related to the first device error in the RFID tag.

11. The method of claim 10, wherein the settings GUI comprises second and third settings options, the second settings option being selectable to grant permission to a first particular application to load error codes onto the RFID tag responsive to determinations that device errors have occurred, the third settings option being selectable to grant permission to a second particular application to load error codes onto the RFID tag responsive to determinations that device errors have occurred, the second particular application being different from the first particular application, the first, second, and third settings options being different from each other.

12. The method of claim 11, wherein the first settings option is selectable to command the device to perform a first type of settings configuration, and wherein the second and third settings options are selectable to command the device to perform a second type of settings configuration, the first type being different from the second type.

13. The method of claim 11, wherein the first particular application is an antivirus application.

14. The method of claim 13, wherein the second particular application is a diagnostic utility different from the antivirus application.

15. The method of claim 10, wherein the settings GUI comprises a second settings option, the second settings option being selectable to set the device to, in the future, write to the RFID tag that no device error has occurred, the second settings option being different from the first settings option.

16. The method of claim 10, comprising:
based on the determining, overwriting, on the RFID tag, already-stored error codes for errors that are outdated or no longer exist.

17. At least one computer readable storage medium (CRSM) that is not a transitory signal, the computer readable storage medium comprising instructions executable by at least one processor to:
present a settings graphical user interface (GUI) on a display, the settings GUI being usable to configure one or more settings of a device to operate to determine device errors and to load associated error codes onto a radio-frequency identification (RFID) element, the settings GUI comprising a first settings option, the first settings option being selectable a single time to set the device to, in multiple future instances, load error codes onto the RFID element;
determine a first device error has occurred for a device; and
based on the determination, write data related to the first device error onto the RFID element.

18. The CRSM of claim 17, wherein the settings GUI comprises second and third settings options, the second settings option being selectable to grant permission to a first particular application to load error codes onto the RFID element responsive to determinations that device errors have occurred, the third settings option being selectable to grant permission to a second particular application to load error codes onto the RFID element responsive to determinations that device errors have occurred, the second particular application being different from the first particular application, the first, second, and third settings options being different from each other.

19. The CRSM of claim 18, wherein the first settings option is selectable to command the device to perform a first type of settings configuration, and wherein the second and third settings options are selectable to command the device to perform a second type of settings configuration, the first type being different from the second type.

20. The CRSM of claim 18, wherein the first particular application is an antivirus application.

* * * * *